(12) United States Patent
Laughlin

(10) Patent No.: US 10,830,383 B2
(45) Date of Patent: Nov. 10, 2020

(54) AUGMENTATION OF MECHANICAL PROPERTIES OF HIGH PRESSURE PIPE

(71) Applicant: Turtle Two Gun Pipe and Welding LLC, The Woodlands, TX (US)

(72) Inventor: Shawn Michael Laughlin, The Woodlands, TX (US)

(73) Assignee: TURTLE TWO GUN PIPE AND WELDING LLC, The Woodlands, TX (US)

( * ) Notice: Subject to any disclaimer, the term of this patent is extended or adjusted under 35 U.S.C. 154(b) by 120 days.

(21) Appl. No.: 15/867,928

(22) Filed: Jan. 11, 2018

(65) Prior Publication Data

US 2019/0211960 A1 Jul. 11, 2019

Related U.S. Application Data

(60) Provisional application No. 62/445,955, filed on Jan. 13, 2017.

(51) Int. Cl.
*F16L 58/02* (2006.01)
*F16L 55/168* (2006.01)
*F16L 55/175* (2006.01)

(52) U.S. Cl.
CPC .......... *F16L 55/1686* (2013.01); *F16L 58/02* (2013.01); *F16L 55/175* (2013.01)

(58) Field of Classification Search
CPC .............................. F16L 55/1686; F16L 58/02
See application file for complete search history.

(56) References Cited

U.S. PATENT DOCUMENTS

| | | | |
|---|---|---|---|
| 4,559,974 A | 12/1985 | Fawley | |
| 4,700,752 A | 10/1987 | Fawley | |
| 4,767,276 A | 8/1988 | Barnes et al. | |
| 5,348,801 A | 9/1994 | Venzi et al. | |
| 5,445,848 A | 8/1995 | Venzi et al. | |
| 5,632,307 A | 5/1997 | Fawley et al. | |
| 6,336,983 B1 | 1/2002 | Fawley | |
| 6,774,066 B1 | 8/2004 | Souza et al. | |
| 7,367,362 B2 | 5/2008 | Rice et al. | |
| 7,387,138 B2 | 6/2008 | Rice et al. | |
| 7,426,942 B2 | 9/2008 | Rice | |
| 7,500,494 B2 | 3/2009 | Robinson et al. | |
| 9,057,473 B2 | 6/2015 | Souza | |

*Primary Examiner* — Jeffry H Aftergut
*Assistant Examiner* — Jaeyun Lee
(74) *Attorney, Agent, or Firm* — Nolte Lackenbach Siegel

(57) ABSTRACT

A method of augmenting the mechanical properties of a pipeline section comprises the steps of (1) identifying a pipeline section which requires verifiable data and analysis to calculate a safe operating pressure; (2) wrapping the external surface of the identified pipeline section with two or more convolutions of homogeneous isotropic thin steel augmentation bands; (3) adhering the convolutions together via a structural adhesive; and (4) determining the pressure-containing ability of the resultant augmented pipeline section, while simultaneously creating the inputs to determine at least one additional useful engineering design input parameter of the augmented pipeline section, required to calculate and validate a safe operating pressure.

15 Claims, 6 Drawing Sheets

AUGMENTATION OF MECHANICAL PROPERTIES OF HIGH PRESSURE PIPE

CROSS-REFERENCE TO RELATED APPLICATIONS

This patent application claims the benefit of provisional patent application Ser. No. 62/445,955, filed Jan. 13, 2017.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

(1) Field of the Invention

The present invention relates to metal tubular structures utilized for the transportation, under pressure, of various fluids. A common structure is a steel pipeline that transports hydrocarbons. As a matter of public safety and regulatory compliance, augmentation of the mechanical properties of the existing pipeline is a recent area of focus, and is often recommended or required. This invention is in the field of devices and methods which augment the mechanical properties of existing pipelines, while retaining the pipelines in place, and if needed while in service.

(2) Description of Related Art

High pressure pipelines have served to transport fluids required to support modern economic activity for over one hundred years. These pipelines have been fabricated via various techniques and methods. The base metal and longitudinal and circumferential joints of the fabricated pipeline can degrade over time via various mechanisms. Importantly, some fabrication methods once utilized have proven to be less than ideal for continued permanent safe operation. Specifically, the toughness of a longitudinal seam, or a heat affected zone ("HAZ") near the seam, may have poor properties. These seams have also been shown to be susceptible to selective seam corrosion ("SSC"). Seam failures have been documented and are a significant threat. In addition, the body of some pipe has been shown to lack the required steel toughness to insure safe operation. Pipe replacement has traditionally been utilized when low toughness is predicted or known. More specifically, electric resistance welded ("ERW") seams have displayed these phenomena. Additionally, over decades of operation, a pipeline may have had specific segments or individual joints of pipe replaced, and the operators may have failed to effectively retain complete, accurate, and verifiable engineering data, to verify that a safe operating pressure can be calculated.

The U.S. Department of Transportation (DOT) has jurisdiction for the safety aspects of pipeline operation in the USA. The regulations are codified in 49 CFR sections 192 and 195, for pipelines that transport hazardous liquid or natural gas. The DOT regulations reference various industry standards, design guidance, and best practice documents. Recent developments in those areas require complete, accurate, and verifiable technical data and analysis. The American Society of Mechanical Engineers (ASME) publishes a natural gas pipeline standard, ASME B31.8 that is incorporated by reference within the DOT safety regulations. This standard requires that ductile fracture arrest be ensured, and that the pipeline have adequate toughness to arrest ductile fracture.

The U.S. Department of Transportation (DOT) mandates that natural gas pipelines operate such that Specified Minimum Yield Strength ("SMYS") is limited by class location. For regulatory purposes, The Maximum Allowable Operating Pressure ("MAOP") is determined by the DOT pipeline safety regulations. Considerations include design characteristics, pipe diameter, wall thickness, strength, and the population density of the pipeline location.

As population density increases in areas adjacent to an existing pipeline, a line may not have the sufficient engineering parameters or material properties to satisfy the regulatory constraints of a class change. This situation would then require a reduction in allowable operating pressure, thicker wall pipe, or a higher yield strength pipe. Pipe replacement involves many operational challenges, particularly in areas with higher population density. Recent technical work has been conducted by the pipeline industry related to in-line inspection ("ILI") to develop a means to utilize internal pipeline nondestructive inspection methods and techniques, to determine engineering parameters of the base pipe. The goal is the ability to determine grade of steel without the need for a destructive test. Strides have been made regarding the ability to determine a tensile or yield strength range for the base steel. No known strides have been made regarding the determination of steel toughness information from internal ILI. The need for an external augmentation method and device that addresses toughness and fracture issues in addition to pressure containing ability remains a pressing industry need. The performance and design requirements of such a device are not trivial.

Safety issues associated with welding and heat effects, particularly on high pressure flammable or inflammable hydrocarbon pipelines, need to be minimized. The potential of weld cracks of various origins need to be eliminated. Future integrity threats need to be minimized. Efficient economic operations need to be achieved, and environmental threats, releases, and detriments need to be minimized. All prior art involved a step of locating a defect. These defects were typically blunt metal loss defects often caused by corrosion, or sharp crack-like defects within the body of the pipe. Prior art restored only the pressure-carrying capacity.

Prior art has revolved around pressure containing ability and restoration of this parameter. Significant work has been done over the many decades to quantify the strength that remains when line pipe has metal loss due to corrosion. Prior art has specifically restored the pressure containing ability. One type of prior art involves helically wrapping a pipe and has taken various forms and embodiments, monofilament metallic wires, fabricated multi-filament metallic wires, non-metallic ropes or tapes, ultra-high strength steel strip, each helically wound around the pipe to restore pressure-containing ability, each with significant complication. None addressed toughness.

Prior composite repair disclosures typically utilized a material section with an effective modulus of elasticity much less than that of the base steel. While such repairs were effective for mitigation of blunt metal loss defects when a properly designed and properly installed composite repair was utilized, the notch toughness of the base steel and of the resultant wrapped pipe were not augmented, and a resulting safe operating pressure could not be determined if the steel was not itself adequate and verifiable. Typical pipeline steels have a modulus of elasticity on the order of 30 million psi. Some wet applied composite repairs may produce a section of pipe with a modulus of elasticity of only 1 million psi. This is not adequate to ensure ductile fracture arrest. Nor is it adequate to mitigate fatigue crack growth.

Prior art did utilize filler material to fill voids or metal loss defects. Prior art tended to focus on the compressive strength of the filler material. Compressive strength really only serves as an easily acquired test parameter and a proxy for modulus. A reasonably high modulus material is required. Excessive focus on compressive strength as a descriptor or differentiator as it relates to filler material for the intended application is not intuitive. Paramount to long term performance is the durability over time and exposure to pipeline conditions. Various epoxy materials have been known in the prior art. Some filled with glass beads, random sized silicates, or other agents intended to increase modulus. Epoxy can be very slow to cure and can be a poor choice when cold application is required. Methacrylate based material with appropriate fill has been utilized. Some products have relied on chemistry that creates open or closed cell structure, via chemical reactions that emit carbon dioxide or other gases. This then requires the need to permit off gassing of the reaction by product. The use of filler material to fill blunt metal loss defects has been utilized within the prior art of composite repairs and welded steel sleeves.

Prior art utilized unidirectional strength fibers embedded in a matrix. This architecture provided restraint in only the hoop stress direction. The pressure containing ability of the restored pipe was the sole performance parameter addressed. U.S. Pat. No. 6,336,983 claimed a method of addressing a weakened area of a pipe comprised of a least one depression in the outer surface of the pipe, and wrapped by unidirectional, high-tensile-strength fibers, cured in a resin matrix. This patent is incorporated by reference in its entirety.

U.S. Pat. No. 4,700,752 taught a method and apparatus for arresting a propagating ductile fracture, the fracture propagating at a high speed in a predetermined direction. This patent is incorporated by reference in its entirety. The apparatus was a high strength material comprised of a plurality of high strength filaments encapsulated in a resin matrix. The apparatus provided only hoop stress reinforcement. A high speed propagating ductile fracture in a predetermined direction is a special phenomenon of design consideration, specifically a phenomenon for some high pressure pipelines and some steel selections. Semi-empirical models, such as the Battelle Two Curve Model, are used as the design guidance, and standards with empirical test data supplied as inputs.

Prior art required that blunt metal loss defects or a crack be present. The prior art was intended to repair or rehabilitate a known defect. The prior art does not provide the critical toughness value information required to ensure arrest of ductile fracture, or the ability to calculate a safe operating pressure in the absence of the historic pipe engineering and steel data. Prior art placed the crack or crack opening within the pipe in compression. The compression straps, sleeves or other devices relied on mechanical connections, bolts, buckles, or clamps, or relied on a thermal welding process to secure the compression devise in place over the crack.

Prior art procedures of cut-out-and-replace are time consuming, operationally challenging, and risk environmental release of contained fluids. Prior art procedures using welded steel sleeves similarly create unfavorable operational and economic disadvantages, as well as future integrity threats and concerns.

U.S. Pat. Nos. 4,559,974, 4,767,276, and 4,700,752 disclose means or methods of wrapping a pipe with fibers embedded in a resin matrix to stop ductile fracture propagation on an existing pipeline. U.S. Pat. Nos. 5,348,801 and 5,445,848 disclose the use of a fabricated tape for wrapping a pipe to provide pressure support. U.S. Pat. No. 5,632,307 discloses the use of a wet uncured filler material to transfer stress from the pipe wall to an external composite wrap. U.S. Pat. No. 6,774,066 discloses a magnetically detectable composite wrap. U.S. Pat. Nos. 7,387,138, 7,426,942, 7,367,362, and 7,500,494 all disclose a method of applying dry fibers around a pipe, and then the addition of resin to create a field-applied composite wrap. U.S. Pat. No. 9,057,473 discloses a method to repair a pipe which has existing cracks, via the application of a compression strap mechanistically secured via a buckle device, and subsequent composite wrapping. Each one of these patents (U.S. Pat. Nos. 4,559,974; 4,767,276; 4,700,752; 5,348,801; 5,445,848; 5,632,307; 6,774,066; 7,387,138; 7,426,942; 7,367,362; 7,500,494; and 9,057,473) is incorporated by reference in its entirety.

Other existing technology utilized for pipe repair requires high temperature welding, which involves various safety and operational concerns. Steel sleeves, typically in the form of two matching 180-degree units, are fitted and welded together. These can be subsequently welded to the pipe with fillet welds at the circumferential ends of the sleeves. The fillet welds leave an integral stress concentrator at the root of the weld, and have resulted in cracks associated with the root. Steel sleeves do not well handle out-of-round conditions or less than perfectly cylindrical pipe. These steel sleeves typically are the same or greater wall thickness as the base pipe, are heavy, and often require extensive material handling equipment. Type A steel sleeves do not utilize a weld to connect the base pipe to the sleeve. Type B sleeves incorporate fillet welds to the base pipe at the end of the sleeves. When a vintage welding technique is utilized to fabricate the base pipe, the subsequent fillet welds of the type B sleeve technique can create multiple integrity threats at the location where the type B fillet weld crosses the vintage seam weld. Inspection of these fillet welds is required. Current regulations require a delayed inspection (typically a minimum of 48 hours after the actual welding) to verify that delayed hydrogen cracking, or under-bead cracking, has not developed. The Type A sleeves rely on intimate 360-degrees contact to provide restraint. Less than 360-degrees of intimate contact with the entire external wall of the carrier pipe is often a reality. The section of a vintage pipe often of greatest integrity concern is at or near the longitudinal weld. This area often has poor or unknown toughness parameters. It is also this area that a Type A sleeve may not well restrain. These welded steel sleeves, or a non-welded clamped and bolted version of steel sleeves, have been fabricated from steel typically at least as thick as the wall thickness of the existing steel pipe. These thick sections provide strength, but often fail to equally share stress over all 360 degrees of circumference of actual field condition pipeline segments. Variations of methods of installation of steel sleeves have attempted to resolve these challenges. These have included grouting of sleeves, heating of the sleeves, and the subsequent shrinkage when cooled, significant hydraulic clamp pressure at installation, systems of machining of the interior sleeve surfaces and shims between the pipe and sleeves, all intended to address out-of-round condition, and create 360 degrees of intimate contact. These more obvious paths have been effective in some situations, but all involve additional complications and operational challenges.

Crack growth and fracture mechanism of steel structures and weldments has been an active field of analysis over recent decades. Historic test mechanisms and data did not always provide an exhaustive review of the phenomena. A Crack Tip Opening Displacement ("CTOD") test and value was defined as a tool to predict the tendency of material to resist crack growth. This was done as a toughness parameter alone. It did not always provide adequate details for design purposes. Good design practice included the elimination of stress concentrators or initiation sites, the avoidance of fracture critical non-redundant members when possible, or special consideration of methods and treatments when a member was fracture-critical to the integrity of the structure. Pressure vessel and pipeline codes and standards do not permit welding arc strikes on the body of the vessel. Welded steel sleeves intended for pipeline repair have been an unrecognized exception to these good practices. A pipe has no redundancy.

A potential crack initiation site on a steel pipe could be within the wall or body of the pipe, often at a discontinuity, often a weld discontinuity, and present at the time of fabrication. A second source of a crack initiation site is something on the external wall, often an impact location created by an outside force, often an excavation tool or a farm implement, and can be created at any time during the service of the pipe. These outside force damage locations begin as dents and gouges on the pipe external surface that lead to crack initiation that then grow and propagate. This type of external outside damage is a significant integrity threat and remains a leading cause of reported pipeline incidents.

Worker safety and public safety of hydrocarbon transporting infrastructure is paramount. Hot work permits are required for many above ground facilities, such as pump or compressor stations, plants, refineries, and offshore platforms. The electric arc and heat of welding creates concerns of an ignition source when flammables are in close proximity. Avoidance of these welding processes is often warranted, and helps to explain the market acceptance of various composite-based repair options. The use of these organic-based composite resins then requires the need to consider their performance in the unfortunate event of a subsequent fire. Even in the cured state, the resins utilized for composite application utilized on pipelines will support combustion, and their performance when exposed to a significant fire or heat source is rapidly diminished. Thus, when fire performance is a significant consideration for safe operation of the infrastructure, neither a welded steel sleeve nor a composite wrap is ideal.

In summary, although many methods and designs for the repair of blunt metal loss defects or cracks of existing high-pressure pipe, specifically the restoration of the pressure containing ability, are well known in the art, considerable shortcomings remain. Actual augmentation of properties of an existing segment of a pipe system or pipeline has not been a focus.

BRIEF SUMMARY OF THE INVENTION

The present invention provides devices and methods to augment both the pressure-containing ability of the pipe, and the steel toughness of the resulting fabrication. Steel in the form of a plurality of thin convolutions is adhered to the external pipe wall. The existing base pipe and the newly adhered steel convolutions combine to provide the engineering parameters required to withstand the operating pressures. The resultant fabrication provides engineering parameters required to calculate a safe operating pressure. The present invention utilizes thin homogeneous steel strips with isotropic properties, to augment the low or unknown impact properties of the existing base pipe. The present invention utilizes thin layers of a homogeneous isotropic steel strip with a modulus of elasticity matched to that of the existing base pipe. The thin layer design and material elasticity insure conformity to the pipe surface, and minimize crack growth potential via greatly increased toughness, and elimination of connected intergranular crack paths. The considered selection of the steel strength member and structural adhesive between layers promote an almost immediate sharing of stress between the base pipe and the augmentation unit. The material properties of the steel strip and adhesive, as well as the shape and thin layer laminated design, are integral contributors to the toughness parameters of the augmentation unit. The close conformity to the pipe surface minimizes delay in dynamic stress-strain response. The toughness of the augmented pipe section is enhanced.

The present invention utilizes various aspects of good design practice to augment a pipe. The intimate contact with the pipe promotes sharing of stress, minimizing any local stress concentration and minimizes delay in stress/strain response. The modulus of elasticity of the steel strip matched to that of the existing steel pipe also promotes the nearly immediate sharing of stress with the pipe. Welding discontinuities (crack initiation sites) are eliminated from the augmentation unit, and the process ensures that no new discontinuities are created within the body of the pipe.

While future test and analysis may indicate that the present invention in various embodiments is well suited to address the special phenomena of propagating ductile fracture, a high-speed crack propagating in a predetermined direction, the present invention addresses augmentation of steel toughness parameters as a means to mitigate more common and mundane fatigue cracks, stress corrosion cracking, and cracks of slow growth or propagation without predetermined direction.

The design of the present repair method anticipates the future potential for external damage as a likely initiation site for an integrity threat to pipeline operation. The selection of thin layers forces any crack that develops to quickly arrive at an interface, where it will terminate. The redundant convolutions with adhesive layers effectively create redundant termination sites for cracks that would be created by external trauma to the unit. The prior art related to steel sleeves does not address this issue. The prior art related to composite repairs does not address this issue.

In another aspect of the present invention, the relatively high modulus, homogeneous isotropic elastic convolutions resist blister type de-bonding from the steel pipe. This minimizes the most common leak path mechanism (blister failure mechanism) and promotes increased longevity of leak sealing.

In yet another aspect of the present invention, the non-flammable augmentation bands eliminate hot work issues and concerns, and greatly increase the effective performance time in the event of exposure to fire.

In yet another aspect of the present invention, the plurality of convolutions provide a redundant system to address and mitigate future integrity threats created by external impact or trauma to the pipeline. This aspect itself can be specifically augmented if blast mitigation or other needs are identified.

BRIEF DESCRIPTION OF THE SEVERAL VIEWS OF THE DRAWINGS

The novel features of the invention are set forth in the appended claims. However, the invention itself, as well as a preferred mode of use, and further objectives and advantages thereof, will best be understood by reference to the following detailed description, when read in conjunction with the accompanying drawings, in which the left-most significant digit in the reference numerals denotes the first figure in which the respective reference numerals appear.

DETAILED DESCRIPTION OF THE INVENTION

Figure 1:
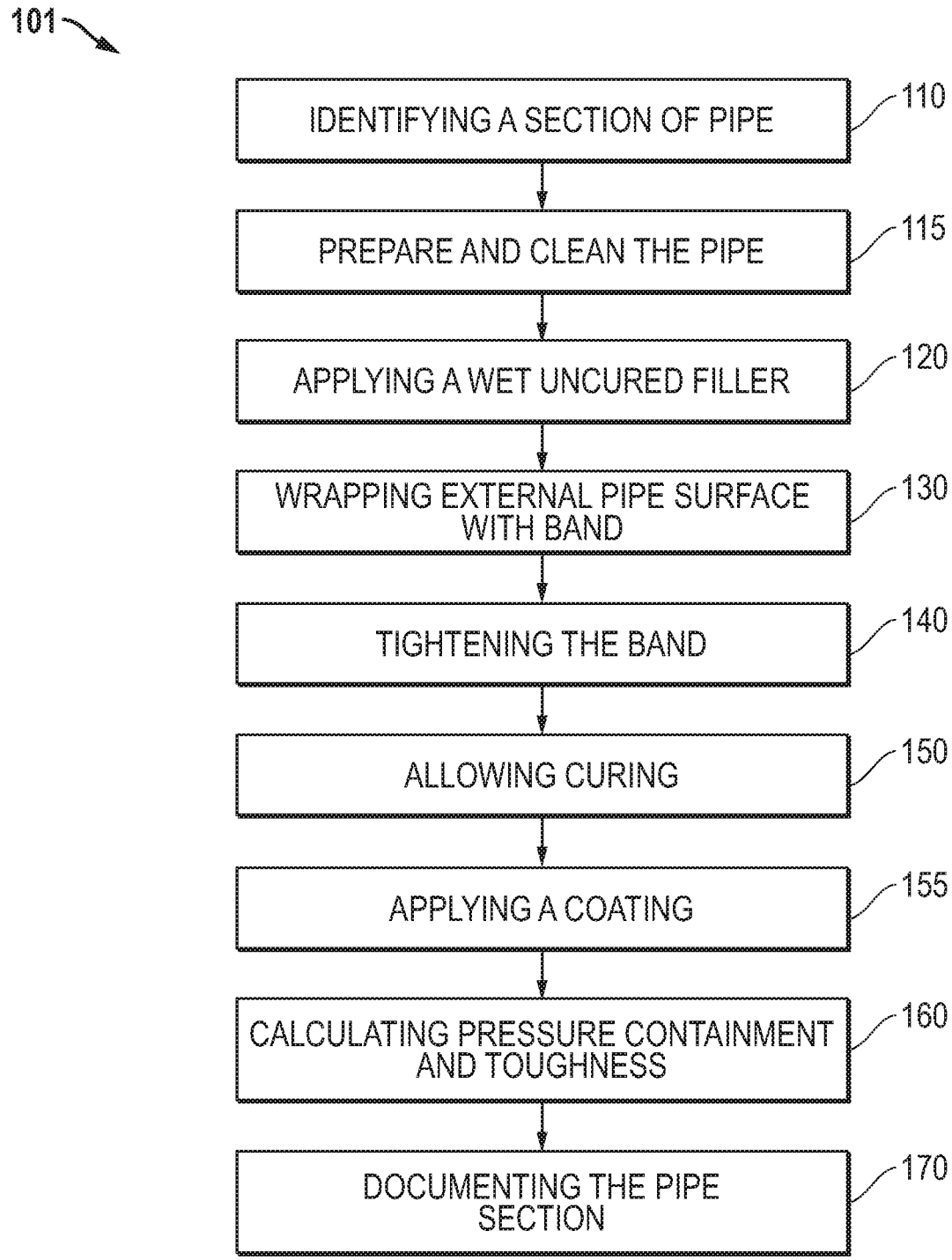
FIG. 1 is a flow diagram, showing the steps of the method of the present invention.

Referring to FIG. 1, in accordance with the present invention, a flow chart depicts a method to augment an existing pipe or piping tubular structure to increase the pressure-carrying ability, ensure ductile fracture arrest, and to prevent seam failures. The method includes the steps of (1) determining the useful engineering parameters of the resulting fabrication required to calculate a safe operating pressure as required by prudent engineering and prevailing codes and regulations, and (2) augmenting the existing pipe or piping structure for the purpose of developing a toughness parameter of the resultant augmented pipe that will ensure ductile fracture arrest, and will prevent seam failures.

In one embodiment, the augmentation method consists of six primary steps:

a. In step 110, identifying a section of a pipe system or pipeline that requires accurate, complete, and verifiable engineering data and analysis to calculate a safe operating pressure.

b. In step 115, preparing the section of a pipe system or pipeline. If the section of a pipe system or pipeline is buried the section of a pipe system or pipeline is excavated, soil removed from an area surrounding the section of a pipe system or pipeline. The section of a pipe system or pipeline is prepared by removal of an existing external pipeline corrosion protection coating and cleaning of the section of a pipe system or pipeline. In addition, an area immediately adjacent to the section of a pipe system or pipeline is also prepared by removal of the existing external pipeline corrosion protection coating and cleaning.

c. In step 120, applying a high modulus filler material, in a wet, uncured state to an external surface of the identified section of the pipe system or pipeline, at a leading edge of an augmentation band, or into a metal loss defect, or around a weld seam protuberance, which may be present. The high modulus filler material is applied either immediately prior to wrapping, or applied, molded, and cured prior to the wrapping step. The high modulus filler material is utilized to transfer a load created by an internal pressure of the section of pipe system or pipeline to an augmentation band. The high modulus filler material is utilized in the event of the metal loss defect on the external surface within the identified section of the pipe system or pipeline, or in the event that the weld seam protuberance is located within the identified section of the pipe system or pipeline. The compressive strength of the high modulus filler material exceeds 8,000 psi.

d. In step 130, wrapping the external surface of the identified section of pipe system or pipeline with two or more convolutions of a material that provides sufficient known material and engineering properties. More specifically, installing a homogeneous isotropic thin layer augmentation band around the section pipe system or pipeline, and adhering the homogeneous isotropic thin layer augmentation band to the section of pipe system or pipeline and adhering each layer of the augmentation band to a subsequent layer of the augmentation band. The known properties can be utilized to model a resultant value for the augmented structure. An optional corrosion barrier or primer may be placed between the section of pipe system or pipeline and the augmentation band. In step 140, the augmentation band is tightened, which extrudes any excess of the high modulus filler material as well as any excess of a structural adhesive. In step 150, the high modulus filler material and the structural adhesive are allowed to cure.

e. In step 155, applying an external pipeline corrosion protection coating over an augmentation area which contains the identified section of pipe system or pipeline and an additional length of pipe system or pipeline, immediately adjacent to the identified section of pipe system or pipeline which has been prepared and cleaned with the existing external pipeline corrosion protection coating removed. This protects the augmentation band from future environmental attack and degradation, as well as protecting the section of pipe system or pipeline immediately adjacent to the identified section of pipe system or pipeline.

f. In step 160, the pressure containing ability and the toughness parameter of the augmented section of pipe system or pipeline, are determined. The safe operating pressure is the key determinate and requires the pressure containing ability and the toughness parameter for fracture analysis. In the situation where the toughness parameter for the section of pipe system or pipeline is either known to be quite low, or not known, the thin layer of the augmentation band design, its ability to conform to the pipe circumference, its modulus of elasticity, combine to enable a dynamic response, and permit the toughness parameter of the resultant fabrication to be determined. Also, in step 170 a pipeline operator records and documents the engineering parameters of the augmented section of pipe system or pipeline within an Integrity Management Plan (IMP) or within an alternative record system, to properly document the section of a pipe system or pipeline.

Figure 2:
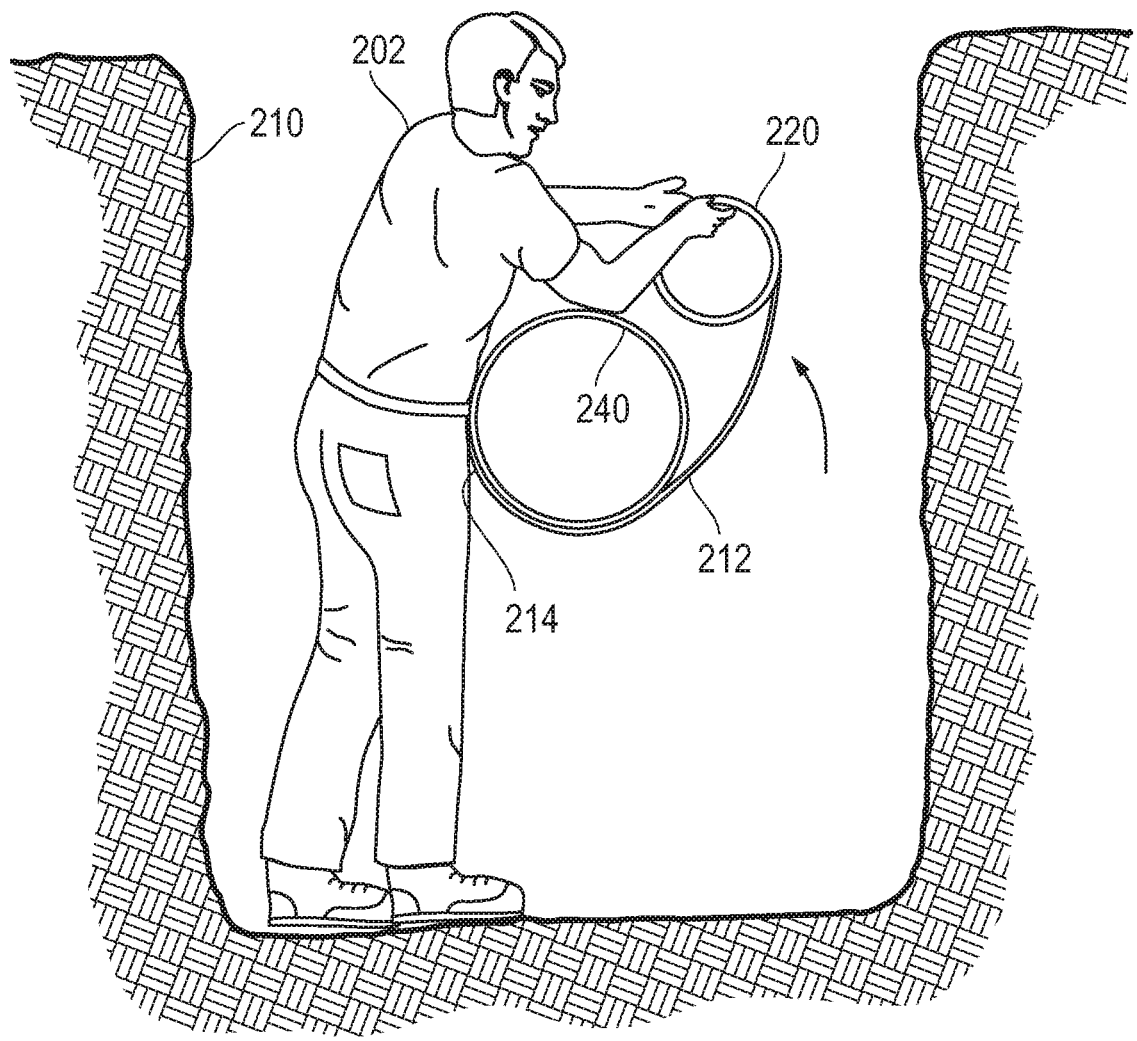
FIG. 2 is a depiction of a field installation, showing the use of a thin layer steel augmentation unit of the present invention.

Referring now to FIG. 2, in one embodiment of the invention, a worker 202 standing within an excavation 210 wraps a plurality of elastic convolutions 212 around a pipe circumference 214. The plurality of elastic convolutions 212 are in the form of an augmentation band 220 and in sufficient layers adequate to calculate the toughness parameter and the pressure containing ability adequate to achieve the safe operating pressure, utilizing the standard acceptable design equations (ASME B31.4, B31.8, B 31.8S, B 31.G, Barlow's Equation). In this embodiment the worker 202 installs the augmentation band 220 on a pipe 240 that is the identified section of pipe system or pipeline. The augmentation band 220 is comprised of the plurality of the elastic convolutions 212 supplied in an amount to facilitate installation. In this figure the pipe 240 has no known defect, no metal loss, and no known cracks. The pipe 240 has a nominal pipe diameter (not shown). The excavation 210 is created following safe techniques and practices. The excavation 210 is large enough such that sufficient clearance exists under the pipe 240 to maneuver the augmentation band 220 around the pipe 240. Within the excavation 210 the area immediately under the pipe 240 can be quite limited, as the augmentation band 220 is very thin and has sufficient rigidity to permit the augmentation band 220 to be pushed under and around the pipe 240 with very limited clearance. The pipe 240 has previously been prepared and cleaned. The cleaning process removes any soil or contaminants from the pipe circumference 214. Also, at the time of deployment the pipe 240 may have had the external pipeline corrosion protection coating (not shown) applied prior to being placed in operation. The pipe cleaning process (not shown) involves the mechanical or chemical removal, or a combined process for the removal of the existing pipeline corrosion protection coating via various processes that are well known in the art. This cleaning and preparation may involve high pressure water jetting, a dry mechanical blasting process with media such as abrasive grit, walnut shells, or rice grains frozen in liquid nitrogen. Other mechanical cleaning processes could include disk grinding, needle gun, wire wheel, or metal blades. These cleaning and preparation processes are well known in the art and are subject to the asset owner's processes and procedures. The coiled shape of the augmentation band 220 is matched to the nominal pipe diameter (not shown) of the pipe 240, and facilitates installation. No cranes or other equipment are required to move the augmentation band 220 to the excavation 210 or to support the augmentation band 220 during installation. Due to its light weight, the augmentation band 220 can be carried and positioned manually. The augmentation band 220 need not always be one continuous band, if weight constraints are important for a specific situation, typical for large diameter pipe, the augmentation band 220 can be installed directly on top of another augmentation band 220.

Figure 3:
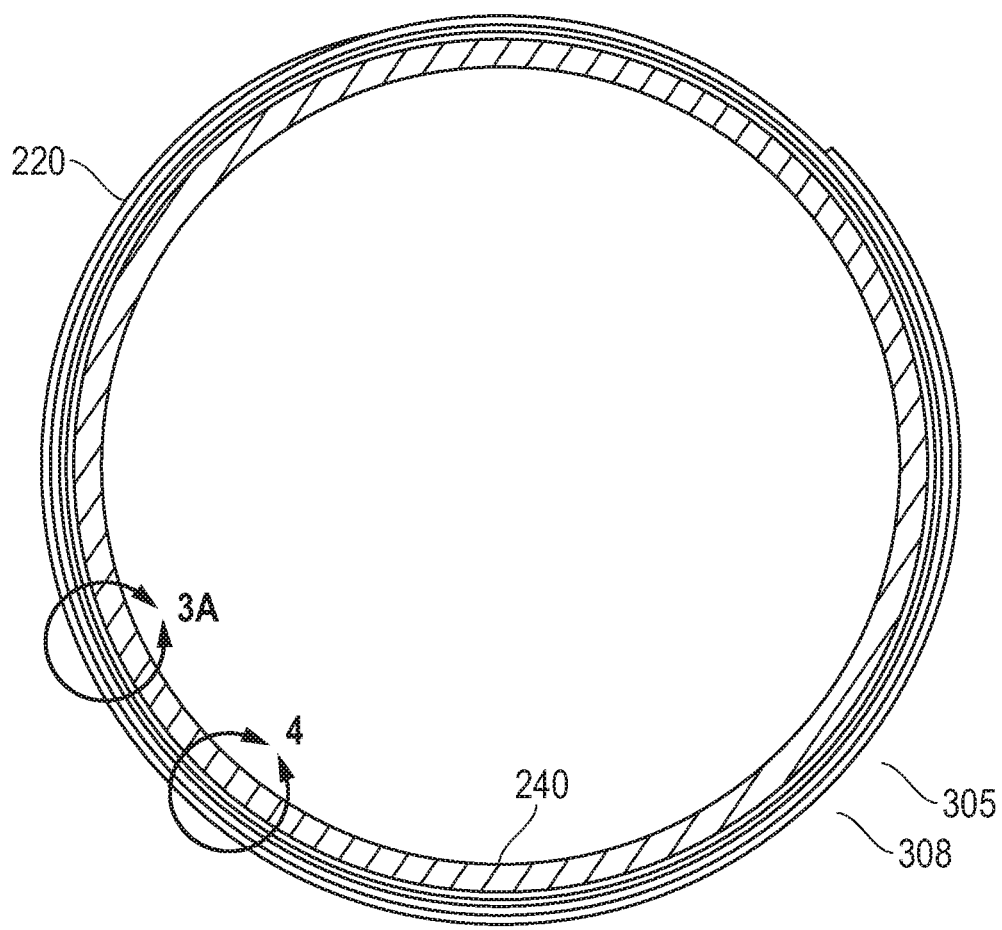
FIG. 3 is a cross sectional view of the base pipe with the augmentation unit of the present invention installed.

Referring now to FIG. 3, in one embodiment of the invention, the pipe 240 is shown with the augmentation band 220 installed. The pipe 240 and the installed augmentation band 220 always create a resultant fabrication 305 which in the case of the pipe 240 creates a defect free augmented pipe 308.

Figure 3A:
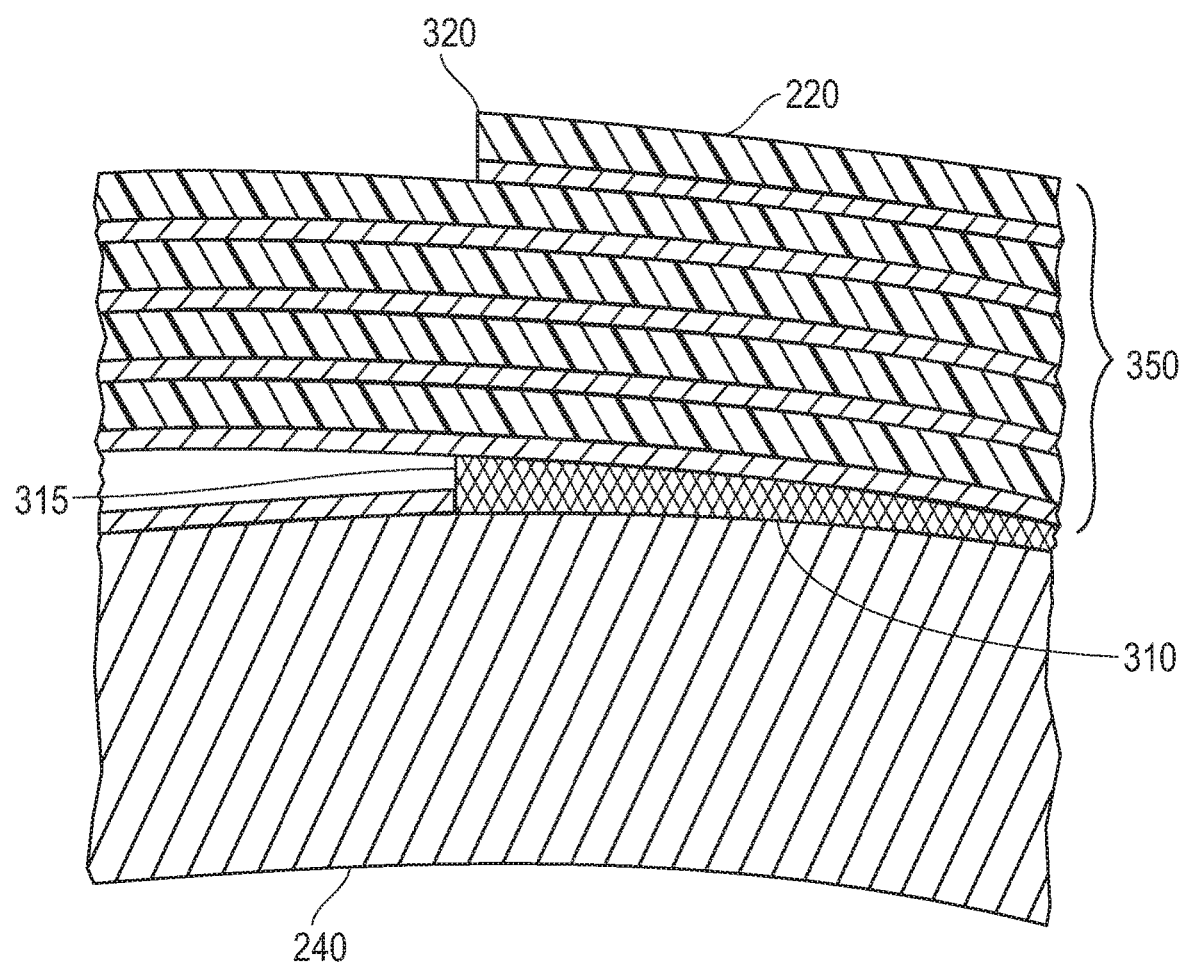
FIG. 3A is a detail view of the base pipe with the augmentation unit of the present invention installed with detail of the leading edge of the augmentation band shown.

Referring now to FIG. 3A, in one embodiment of the invention, a perspective view of the pipe 240 with the augmentation band 220 installed is shown. A filler material 310 has been applied to the pipe 240 at a leading edge 315 of the augmentation band 220 to ensure intimate contact and load transfer between the pipe 240 and the augmentation band 220. A trailing edge 320 of the augmentation band 220 is shown. The pipe 240 to the augmentation band 220 interface is intimate for the entirety of the pipe circumference 214. The modulus of elasticity of the augmentation band 220 reasonably matches that of the pipe 240 and ensures no delay in dynamic stress/strain response. The augmentation band 220 has sufficient elasticity and its thin design permit conformity with significant out-of-round pipe, placing the entire pipe circumference 214 in intimate contact with either the augmentation band 220 or the filler material 310. The total wrap thickness 350 is the sum of each thickness of each of the augmentation band 220 installed over a specific point of the pipe 240.

The filler material 310 is selected with consideration toward durability and compatibility with pipeline operating conditions. The preferred embodiment of the subject augmentation unit utilizes a methacrylate base and filled putty with viscosity selected to minimize excess drooping. Compatibility with pipeline cathodic protection voltages has been demonstrated.

Figure 4:
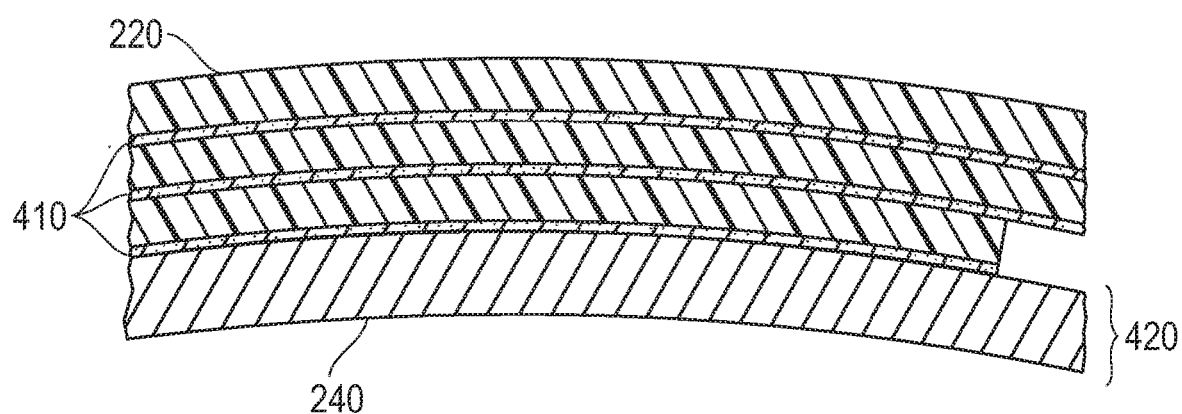
FIG. 4 is a detail view of the base pipe with the thin layer augmentation unit of the present invention installed.

Referring now to FIG. 4, in one embodiment of the invention, a perspective view of section of the pipe 240 with the augmentation band 220 installed is shown. A thin layer of a structural adhesive 410 is shown between the pipe outer circumference 214 and the augmentation band 220 as well as between each layer of the augmentation band 220. The structural adhesive 410 is selected to provide the lap-shear strength required as well as providing sufficient elongation to avoid point loading of the adhesive system to prevent an "unzipping" failure, or sequential premature failure of the adhesive. The thin layer design of the augmentation band 220 combined with the thin layer structural adhesive 410 to maximize energy absorption and results in a high fracture toughness. A pipe through wall thickness 420 is shown and is a key input for all design and analysis equations.

The selection and specification of the structural adhesive 410 varies based on the required parameters, as well as environmental conditions. The preferred embodiment includes the structural adhesive 410 selected as a methacrylate, catalyzed via an adhesive activator (not shown). The specific preferred adhesive utilizes a longer polymer chain then did older generations, this ensures less volatile components and provides various performance benefits. The mechanical properties of the structural adhesive 410 are consistent across typical temperature of installation and compatible with pipeline cathodic protection systems. While the preferred methacrylate does provide operational advantages for many situations, the use of various epoxy formulations or urethane based adhesives or others adhesive technologies is warranted for specific situations.

The structural adhesive 410 and the filler material 310 need to be compatible with each other. In addition, the durability of these systems in pipeline application over extended periods of time is a primary selection criterion.

The wrapping step 130 involves several activities. The worker 202 has previously been trained and operator qualified for the task of installation. The worker 202 determines the relevant ambient temperature at the installation location. The worker 202 then determines the amount of the adhesive activator required for the relevant temperature and a non-activated adhesive (not shown) supplied which varies dependent on the pipe diameter (not shown) and the amount of the augmentation band 220 required. The worker 202 opens an adhesive container (not shown) of the non-activated structural adhesive. The worker 202 opens an adhesive activator container (not shown). The worker 202 mixes the non-activated adhesive and the adhesive activator to insure complete mixing. The worker 202 opens a filler material container (not shown) and transfers the non-activated filler material (not shown) to a filler material mixing vessel (not shown). The worker opens a filler material activator container (not shown). The worker 202 measures by volume the amount of the filler material activator required. The worker 202 adds the filler material activator to the non-activated filler and mixes to ensure complete mixing. The worker 202 places a small amount of the filler material 310 on the pipe surface at the location where the leading edge 315 of the band 220 will be placed on the pipe surface. The worker places the filler material 310 around any weld protuberance (if present) or within any identified metal loss defect (if present. Not present on the pipe 240). The worker installs a specialized starter pad (not shown) which adheres the leading edge 315 of the augmentation bands 220 to the pipe 240 and serves to facilitate a subsequent tightening of the augmentation bands 220. The worker utilizes a roller (not shown) to cover the pipe circumference 214 with the structural adhesive 410. The worker 202 places the leading edge 315 of the band 220 on the specialized starter pad. The worker 202 then wraps the band 220 around the pipe 240, adding the structural adhesive 410 on each layer. A second worker (not shown) is typically involved during this portion of the wrapping step, the worker 202 wrapping and the second worker applying the structural adhesive 410 to the pipe 240 and between each layer of the augmentation band 220. The worker 202 and the second worker may alternate activities on each side of the excavation 210. The wrapping process continues until a final band revolution (not shown) is reached.

The worker 202 tightens or cinches the augmentation band 220 to the pipe 240 or to the augmentation band 220 that was previously installed. In one embodiment this tightening step is completed via a cinch bar and strap (not shown). In another embodiment a ratchet tie down strap (not shown) is utilized or a hose clamping device (not shown) is utilized, which are well known in the art. In one embodiment the augmentation band 220 is modified to include a series of punched or drilled holes (not shown) near the trailing edge 320 of the augmentation band 220. The series of punched or drilled holes permit a connection point (not shown) for the cinch bar and strap. The strength and isotropic properties of the augmentation band 220 permit the exploitation of this novel cinching technique. The torque or force required is not a critical variable for this tightening or cinching step. The tightening of the augmentation bands extrudes any excess of the filler material 310 or of the structural adhesive 410. The worker 202 secures the augmentation band 220 in place with a temporary device (not shown) such as a filament tape of a hose clamp while the filler material 310 and the structural adhesive 410 are allowed to cure. The worker 202 removes the temporary device after curing.

The worker 202 retains a small amount of the filler material 310 and the structural adhesive 410 to help verify that satisfactory cure has been achieved. The method of the present invention is designed so that the curing step 150 requires no more than two hours. The worker 202 performs a quality assurance/quality control verification by measuring the hardness of the structural adhesive 410 retained or exposed on the augmentation band 220 or on the pipe 240

A width (not shown) of the augmentation band 220 can be varied. In the most preferred embodiment the width is approximately eleven and seven-eighths inches wide (nominal twelve inch). The width is selected based on ease of installation with consideration to worker safety and fatigue associated with the mass of the augmentation band 220. The width can be either a lesser dimension or a greater dimension. The augmentation band 220 is installed in numbers or multiples along any desired linear length of the pipe 240. The augmentation band 220 is installed immediately adjacent to a previous installation of the augmentation band 220. As previously described, the augmentation band 220 need not be comprised of one continuous coil. The augmentation band 220 can be installed directly over the previous installation of the augmentation band 220 to increase the total wrap thickness 350. In addition, when the augmentation band 220 is installed immediately adjacent to the previous installation of the augmentation band 220 a seam (not shown) is created. The augmentation band 220 can be installed such that the seam is covered by a subsequent installation of the augmentation band 220, this "running bond" pattern can be utilized to facilitate worker activities while working in the excavation 210.

If the identified section of pipe system or pipeline includes a circumferential welded joint (not shown), the augmentation band 220 is selected or cut to a width such that the augmentation band 220 will closely abut the circumferential welded joint. The circumferential welded joint is an artifact of pipe construction. The circumferential welded joint is utilized to join discrete pieces of line pipe. The circumferential welded joint is characterized by having a protuberance of weld metal (not shown) above the pipe circumference 214. The protuberance of weld metal above the pipe circumference 214 requires a specialized installation pattern for the augmentation bands 220 and the filler material 320. This specialized installation pattern is a bridge technique (not shown). The worker 202 installs the augmentation band 220 on each side of the circumferential welded joint. The worker 202 installs the augmentation band 220 as a bridge unit (not shown) to "bridge" over the protuberance of weld metal, and onto a top surface (not shown) of the augmentation band 220 installed on each side of the circumferential welded joint. The worker 202 uses the filler material 310 to fill any void or annular space created which surrounds the circumferential welded joint. This technique utilizes three units of the augmentation band 220 with the application of the filler material 310 around the circumferential welded joint and under the augmentation band 220 which forms the bridge unit.

A long length of a pipe system or pipeline can be augmented. The worker 202 installs the augmentation bands 220 immediately adjacent to each other in a linear fashion over a selected distance (not shown) of the long length of a pipe system or pipeline. When the circumferential welded joint is encountered the circumferential welded joint is addressed by the bridge technique described. Combining these installation methods permits continuous coverage over the long length of the section of pipe system or pipeline identified for augmentation.

In the preferred embodiment, the augmentation band 220 is the plurality of elastic convolutions 212 and is fabricated from a steel strip (not shown) which is a homogeneous isotropic material with known chemistry and mechanical properties. The steel strip is commercially available in various chemistries and grades, and available in appropriate width and surface treatments for the intended pipeline application. The steel strip grade, chemistry, thermal treatment, and mechanical handling are selected based on the specific design requirements of the pipe 240. Considered selection of the steel strip involves facets of multiple arts. The material properties of the specific strip are predicated on the steel strip chemistry, thermal history, and mechanical treatments. These predications and properties will be known to those skilled in the art of steel making and art of design dependent on steel properties. The steel strip must also be compatible with the pipe 240. Therefore, significant dissimilarities in chemistry need to be considered. The arts of corrosion mitigation and cathodic protection are relevant to the steel strip selection considerations. The preferred embodiment utilizes the plurality of elastic convolutions 212 of the steel strip such as AISI/SAE 1010 grade. The steel strip grade and chemistry effectively address the vast majority of existing installed pipeline steels. The thickness of the plurality of elastic convolutions 212 can be kept thin (0.015-0.035 inches thick) to facilitate ease of installation, and maximize the effective toughness of the resultant fabrication. The plurality of elastic convolutions 212 is mechanically manipulated to have a curvature matched to the nominal pipe diameter of the pipe 240. The required number of the convolutions 212 of the augmentation band 220 is calculated based on the engineering requirements of the section of pipe system or pipeline. The augmentation band 220 shares the hoop stress with the pipe 240. The ratio of the pipe through wall thickness 420 of the pipe 240 and the total wrap thickness 350, and the ratio of the yield strength of the pipe 240 and the yield strength of the augmentation band 220, are utilized to determine parameters of the resultant fabrication. The pressure containing ability and the toughness parameter of the augmented section of pipe system or pipeline, are determined. The safe operating pressure is the key determinate and requires the pressure containing ability and the toughness parameter for fracture analysis. The engineering parameters of the total wrap thickness 350 can be utilized without contribution from the pipe 240, if the pipe 240 values are not known. Specific engineering focus is placed on the toughness parameter, often measured by Charpy V-Notch specimens ("CVN") or drop-weight tear test ("DWTT"). The total wrap thickness 350 is designed to provide the toughness required to meet existing modern code and regulatory requirements. In the thin layers and grade disclosed for the preferred embodiment of this invention, the effective toughness of the steel augmentation band 220 is greater than 150 ft-lbs. (@ −20 degrees F.) and is typically much greater than would be an equivalent monolithic thickness (not shown) for vintage pipe steel or the steel utilized for the prior art steel sleeves. This design and material selection provide the ability to calculate and ensure ductile fracture arrest as required by the prevailing federal regulations.

In the preferred embodiment, the invention provides for the engineering data and analysis to evaluate several areas of significant non-trivial interest. The thin layer design which promotes close conformity to the pipe 240, the isotropic properties of the augmentation band 220, the toughness parameter derived from material properties and form, and the modulus of elasticity of the augmentation band 220 all combine such that evaluation of pipeline parameters in addition to the traditional and singular focus of restoration of hoop strength is available. Unlike new pipeline design requirements, the regulatory environment has not specifically mandated that a repair address issues related to the toughness parameter, fracture initiation or control, ductile fracture or fracture control plans. However, the method of the present invention provides the ability to address such issues. The method of the present invention augments the pipe 240 via the addition of thin layer homogeneous isotropic steel with known parameters to enable the proper documentation of the resultant fabrication 305. The defect-free augmented pipe 308 provides various engineering parameters available to exploit for safety and operational enhancements.

In the preferred embodiment, the invention provides for mitigation of future integrity threats created by a future external trauma event (not shown) to the pipe 240 and specifically to the augmentation bands 220. The plurality of elastic convolutions 212 in thin layer form with proper selection of the structural adhesive 410 provides redundancy for the mitigation of crack growth. Both material properties and laminated form mitigate potential future external integrity threats.

In the preferred embodiment, the invention provides for mitigation of future integrity threats created by a future external fire event (not shown) to the pipe 240 and specifically to the augmentation bands 220. The plurality of elastic convolutions 212 in thin layer form and comprised of the steel strip resist rapid oxidation and do not support combustion. Both material properties and laminated form mitigate potential future external fire threats.

Figure 5:
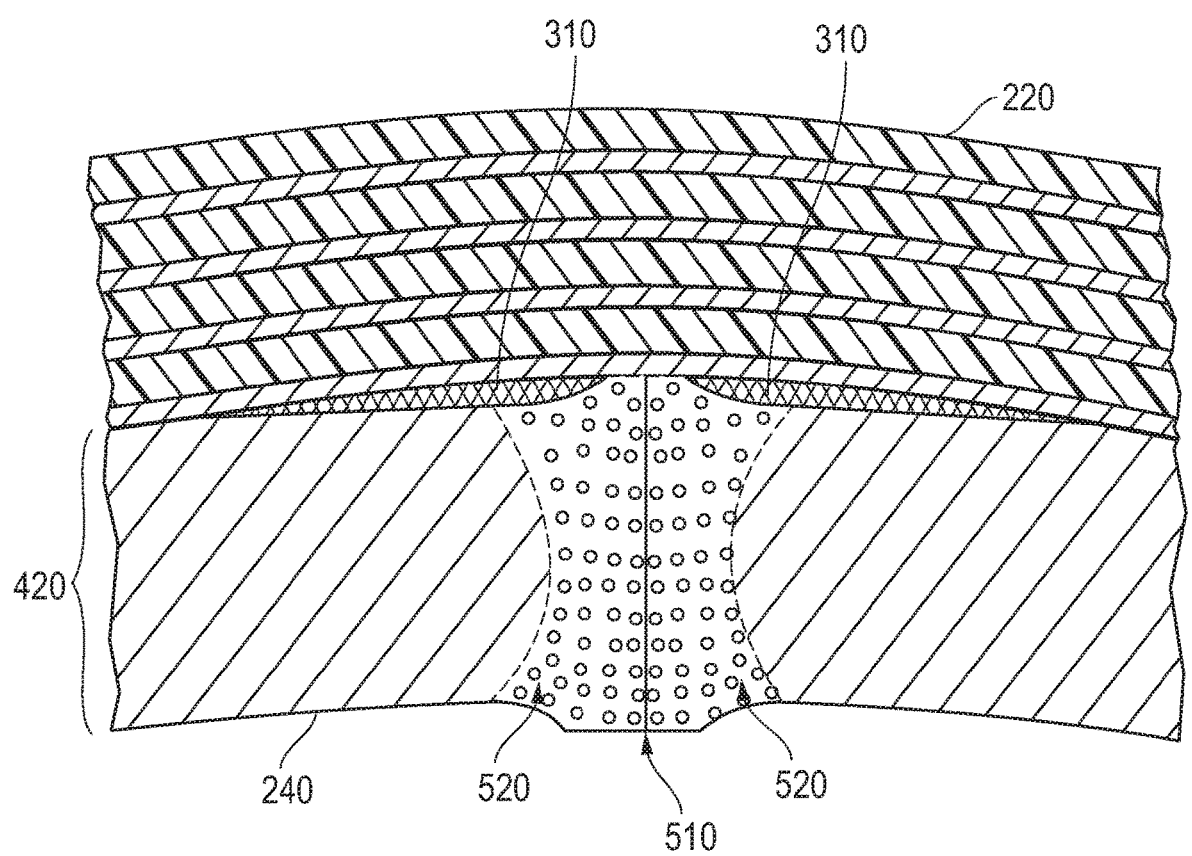
FIG. 5 is a cross sectional view of a pipe, which had been fabricated with an electric resistance welding process, with the augmentation unit of the present invention installed.

Referring to FIG. 5, in one embodiment of the invention, a perspective view of an Electric Resistance Welded (ERW) seam 510 of the pipe 240 is shown with the augmentation band 220 installed. The ERW seam 510 is shown, along with a heat affected zone (HAZ) 520 of the weld. It is this type of pipe fabrication that has displayed multiple failures and has been a source of uncontrolled releases of hydrocarbons to the environment. The failure mechanisms of these seams have been shown to include several contributing factors and to display multiple phenomena. The filler material 310 is shown, and serves to help the nearly instantaneous transfer of the pipe pressure and any related stress to the augmentation bands 220. The isotropic characteristic of the augmentation bands 220 provides restraint in a longitudinal direction as well as in a hoop stress direction. The effective toughness of the augmentation band 220 and shared stress with the pipe 240 serve to mitigate integrity threats to the pipe 240 that originate internal to the pipe 240 or within the pipe through wall thickness 420.

Many fabrication techniques have been utilized over the decades to fabricate pipe from steel plate or steel coils. A pipe fabrication weld (not shown) can be longitudinal, typical when steel plate is rolled and welded into cylindrical pipe form. The pipe fabrication weld can spiral along a pipe length (not shown), typical when pipe is formed from a continuous coil. The pipe fabrication weld does typically extend above the surface of the pipe and form the protuberance of weld metal above the pipe surface. While FIG. 5 depicts the ERW seam 510, the pipe fabrication seam created by any other welding process is treated in a very similar manor. The ERW seam 510 shown in FIG. 5 is selected for consideration as this type of weld seam has been identified as a high potential integrity threat that requires a pipeline operator's analysis.

Pipe can be fabricated as "seamless". This type of pipe is fabricated more integral to the steel making process and does not involve the pipe fabrication weld, either longitudinal or spiral. Regardless of the historic fabrication technique utilized to form pipe, FIG. 5 serves to illustrate how the pipe fabrication weld is treated, when encountered.

Figure 6:
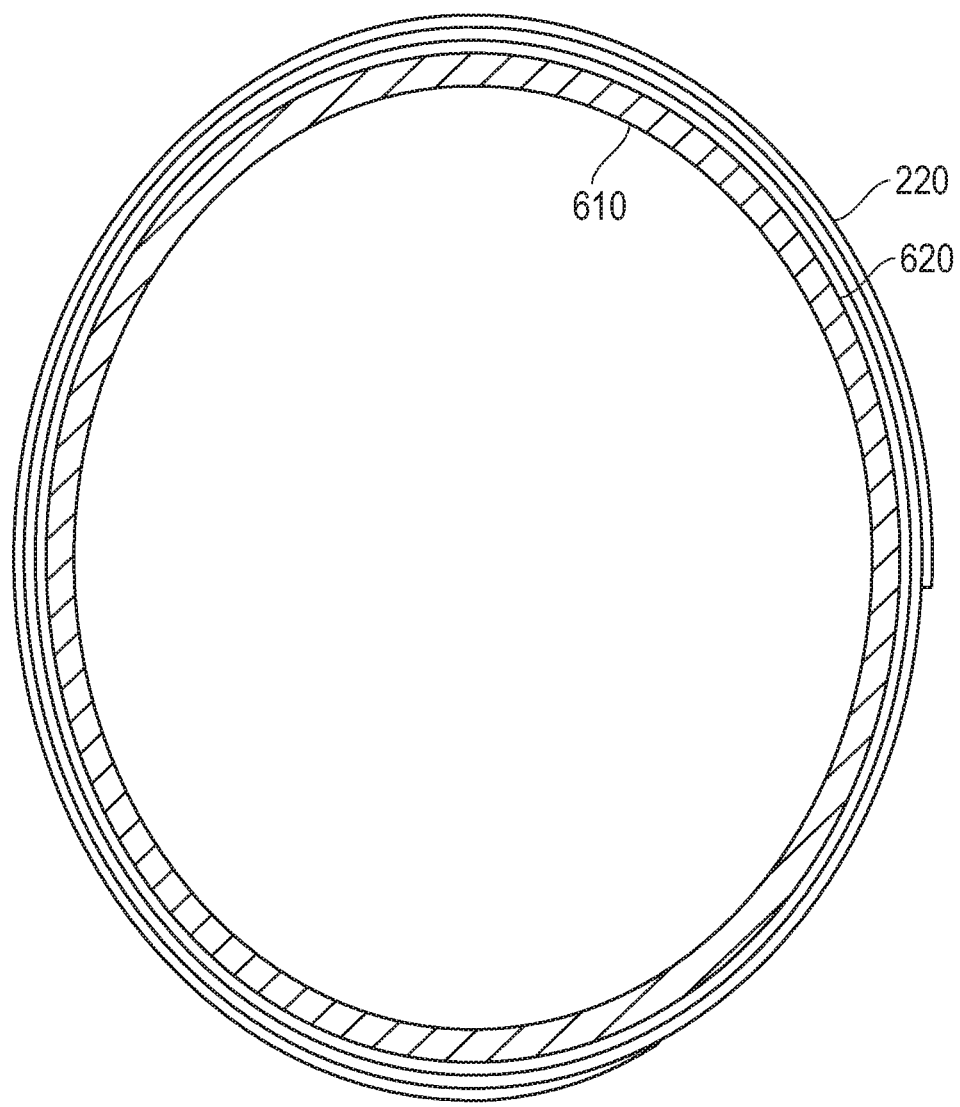
FIG. 6 is a cross section view of pipe that is out of round, and the augmentation unit installed.

Referring now to FIG. 6, a perspective view of an out-of-round pipe 610 with an augmentation band 220 installed is shown. An outer surface 620 of the out-of-round pipe 610 is shown. The outer surface 620 of the out-of-round pipe 610 is not cylindrical or round. The elastic properties of the augmentation band 220 and thin design permit conformity with significant variation of the out-of-round pipe 610, placing the entire pipe outer surface 620 in intimate contact with the augmentation band 220. The mitigation principle requires that stress be shared around the outer surface 620.

Out-of-round, oval, or "egg-shaped" pipe is common. Pipe can be fabricated at a pipe mill (not shown) with less than a perfect cylindrical shape. Residual stress associated with the original fabrication leads to this condition. Shipping and weight bearing issues while racked and stored and prior to lowering into the ditch also lead to out of roundness. The various prior art methods directed at blunt metal loss repair have been adequate to address the pressure-containing ability parameters. Fracture control and mitigation efforts require minimal delay in stress-strain response, and greatly benefit from modulus values nearer the base pipe. The ability to have the entirety of the pipe outer surface 620 in intimate contact with the augmentation bands 220, and quickly share stress with the out-of-round pipe 610 is paramount to effective mitigation and modeling of fracture mechanisms.

The most preferred embodiment of the invention utilizes the plurality of elastic convolutions 212 of the steel strip, AISI/SAE 1010 grade, 0.025 inches thick. The thin-layer design of the plurality of elastic convolutions 212 and the thin layer of the structural adhesive 410 (see FIG. 4) combine to eliminate intergranular crack propagation paths. The effective toughness parameter of the augmentation band 220 is greater than a value for an equivalent monolithic steel specimen (not shown). The thin layer design conforms to the pipe 240, and well conforms to the outer surface 620 of the out-of-round pipe 610. This intimate contact and conformity with the entirety of the pipe circumference 214 (see FIG. 2) of the pipe 240 (see FIG. 2) or the outer surface 620 of the out-of-round pipe 610 serves to share the stress evenly as the radial pressure increases. The homogeneous and isotropic nature of the steel strip facilitates the required reliable engineering analysis, in particular as it relates to the toughness parameter. Toughness is required to stop propagation of cracks and ensure arrest of ductile fracture. The installation of a properly-designed augmentation devise comprised of the augmentation band 220 comprised of AISI/SAE 1010 steel layers, with each layer being thin relative to the pipe 240 (see FIG. 2), with the total wrap thickness 350 (see FIG. 3A) sufficient for the identified section of pipe system or pipeline, provides the engineering data and analysis basis for all prevailing codes and regulations. These attributes combine such that crack growth models can be utilized to calculate a critical crack length (longer after augmentation) and a fatigue life (longer after augmentation). In the absence of a known crack or a known defect, these attributes combine to increase the pressure-containing ability, provide extra metal as mitigation against potential future third party damage, and provide the toughness parameter required to address fracture analysis. The safe operating pressure is determined.

The curing step 150 shown in FIG. 1 is required for proper performance. The filler material 310 (see FIG. 3A) and the structural adhesive 410 (see FIG. 4) must cure to provide the required performance parameters. In the preferred embodiment, the structural adhesive and the adhesive activator as well as the filler material and the filler activator technology permit control of a cure rate and a working time, facilitating ease of workmanship issues. The working time is varied based on expected constraints, ambient temperature, or experience of the crew, and effected by the amount of the adhesive activator and the filler activator utilized. The cure time is selected to avoid needless delays in subsequent activities.

The applying step 155 is largely a matter of good pipeline integrity stewardship. The pipe 240 (see FIG. 2) has been prepared and cleaned with the existing external pipeline corrosion protection coating removed. The area immediately adjacent to the section of pipe system or pipeline has also been prepared and cleaned with the existing external pipeline corrosion protection coating removed. These areas of the pipe 240 (see FIG. 2) need to be recoated for corrosion protection purposes. The preferred embodiment of the invention is significantly comprised of the augmentation band 220 (see FIG. 2), and is ferrous steel. Proper corrosion protection coating is required. During this step an entire augmentation area, both the pipe 240 (see FIG. 2) with the augmentation band 220 (see FIG. 2) installed and the area immediately adjacent the augmented section of the pipe system or pipeline are coated for corrosion protection purposes. Various methods are well known in the art. Pipeline assets owners typically have a specific list of approved and preferred methods.

Step 160 of determining a safe operating pressure involves several specific engineering design determinations. For the pressure-containing ability various assessment equation and techniques are permitted and utilized; these are well known to those skilled in the art. Fracture control analysis requires the toughness parameter. The determination of the toughness parameter of the augmented section of pipe system or pipeline is utilized by the integrity engineer as the basis for assessment and analysis.

Step 170 is essentially a regulatory requirement. Complete, accurate and verifiable records are the regulatory requirement for pipeline operators. The values for the resultant fabrication 305 (see FIG. 3) of the section of pipe identified for augmentation and the augmentation band 220 (see FIG. 2) are recorded within the required Integrity Management Plan (IMP) and a formal pipeline data base system or within the alternative record system.

In one embodiment the plurality of elastic convolutions 212 (see FIG. 2) are coated or treated to mitigate potential future corrosion threats.

In another embodiment the augmentation band 220 (see FIG. 2) is instrumented with a sensor to provide data to the pipeline operator.

In one embodiment, the augmentation band 220 (see FIG. 2) is selected for application on the pipe 240 (see FIG. 2) which has a high yield strength (grade X-70 or above). The considered selection of base material for the augmentation band 220 (see FIG. 2) involves both total wrap thickness 350 (see FIG. 3A) and yield strength. The ratio of the high yield strength of the pipe 240 (see FIG. 2) to an ultimate tensile strength of the pipe 240 (see FIG. 2) is considered.

In yet another embodiment, the pipe 240 (see FIG. 2) to be augmented is a high alloy stainless steel or other high alloy content metal pipe. The augmentation band 220 (see FIG. 2) is selected based on design options which involve mechanical issues, corrosion issues, temperature performance, performance when exposed to various potential chemicals, and other design inputs.

In yet another embodiment, the band 220 (see FIG. 2) is specially selected to provide a set of characteristics that facilitate an automated machine applied continuous process.

In another embodiment, the band material is a non-homogeneous but nearly isotropic. The elastic convolutions are a composite design comprised of selections of constituent components consisting of strength members of carbon fiber, aramid fiber, glass strands, metallic wires, or other materials which are utilized in specific directional format to provide nearly isotropic properties to enable the appropriate engineering calculations. These strength members are held in place by a matrix of polyester, epoxy resin, vinyl ester, phenolic, or other resin.

In another embodiment, the band material is a combination of composite convolution or layers and steel convolutions or layers.

Although an illustrative embodiment of the invention has been shown and described, other modifications, changes, and substitutions are intended in the foregoing disclosure. For example, the elastic convolutions may be fabricated from other materials, such as stainless-steel grades or non-ferrous metals. In addition, the initial layer installed on the pipe surface may be fabricated from selected elastomeric materials and may seal in differing manners, one band sealing according to one of the embodiments described above, and the other augmentation bands according to another. Further, other engineering parameters may substitute for those specifically listed in the claims and background discussion. Accordingly, it is appropriate that the appended claims be construed broadly and consistent with the scope of the invention.

What is claimed is:

1. A method of augmenting an existing pipeline section, the method comprising the steps of:
    identifying a pipeline section which requires verifiable data and analysis to calculate a safe operating pressure;
    applying a high modulus material, in a wet, uncured state to an external surface of the pipeline section, wherein the compressive strength of the high modulus material exceeds 8,000 lbs. per square inch;
    wrapping the external surface of the identified pipeline section with two or more convolutions of a band material, the modulus of elasticity of the band material matched to that of the pipeline section, to create an augmented pipeline section;
    adhering the convolutions together via a structural adhesive, relying solely on the material strength of the band material and cured lap shear strength of the adhesive, without additional external strength member applied, without reliance on mechanical buckles, bolts, or other mechanical means, and without the use of high temperature electric arc or thermal welding processes to secure the band material;
    determining the pressure-containing ability of the resultant augmented pipeline section, while simultaneously creating the inputs to determine at least one additional useful engineering design input parameter of the augmented pipeline section, required to calculate and validate a safe operating pressure.

2. The method of claim 1, further comprising, after the step of wrapping, a step of applying a pipe corrosion coating over the band material.

3. The method of claim 1, wherein the additional design input parameter required to be determined is a steel toughness value for the augmented pipeline section.

4. The method of claim 1, wherein the additional design input parameter to be determined addresses the ability of the augmented pipeline section to resist crack growth, metal fatigue, or fatigue crack growth.

5. The method of claim 1, wherein the additional design input parameter to be determined is a yield or tensile strength value which is not in the radial direction of the pipeline section.

6. The method of claim 1, wherein the additional design input parameter to be determined is Young's modulus of elasticity of the augmented pipeline section.

7. The method of claim 1, wherein the additional design input parameter to be determined is a measure of resistivity to plastic collapse required for the development of a fracture control plan.

8. The method of claim 1, wherein the augmentation device provides integral mitigation of future potential external trauma events to the augmented pipeline section.

9. The method of claim 1, wherein the step of utilizing a wet uncured filler material is replaced with a molding process to fill any metal loss defect or cover any protuberance.

10. The method of claim 1, wherein the band material is drilled or punched, so that a cinching tool can temporarily be attached then removed, and leave no external connection residue.

11. The method of claim 1, wherein band material is applied to be in close effective intimate contact with 360 degrees of the pipeline section circumference.

12. The method of claim 1, wherein material properties of the band material do not degrade over time.

13. A method of repairing an existing pipeline section to create a resultant repaired pipe section, the method comprising the steps of:
    identifying a pipeline section which requires verifiable data and analysis to calculate a safe operating pressure, and which has a blunt metal loss defect;
    wrapping the external surface of the pipeline section with two or more convolutions, in sufficient number of convolutions to create a total wrap thickness, of a band material which provides sufficient known material and engineering properties, in its selected applied total wrap thickness, to enable the calculation of a safe operating pressure, the band material forming multiple layers, each layer of the multiple layers thinner than the wall thickness of the pipeline section, with a modulus matched to that of the pipeline section, adhered to each other with an adhesive or a resin, the band material not secured in place on the pipe or connected to the pipe via a high temperature thermal or electric welding process, wherein the band material comprises a homogeneous isotropic steel;
    determining the pressure-containing ability of the resultant repaired pipe section, and at least one additional useful engineering design input parameter, of the resultant repaired pipe section, required to calculate a safe operating pressure.

14. A method of repairing an existing pipeline section to create a resultant repaired pipe section, the method comprising the steps of:
    identifying a pipeline section which requires verifiable data and analysis to calculate a safe operating pressure, and which has a sharp crack or crack like defect;
    wrapping the external surface of the pipeline section with two or more convolutions, in sufficient number of convolutions to create a total wrap thickness, of a band material which provides sufficient known material and engineering properties, in its selected applied total wrap thickness, to enable the calculation of a safe operating pressure, the band material forming multiple layers, each layer of the multiple layers thinner than the wall thickness of the pipeline section, with a modulus matched to that of the pipeline section, adhered to each other with an adhesive or a resin, the band material not secured in place on the pipe or connected to the pipe via a high temperature thermal or electric welding process, wherein the band material comprises a homogeneous isotropic steel; and
    determining the pressure-containing ability of the resultant repaired pipe section, and at least one additional useful engineering design input parameter, of the resultant repaired pipe section, required to calculate a safe operating pressure.

15. The method of claim 1, wherein the band material comprises a homogeneous isotropic thin steel band to form a steel augmentation band.

\* \* \* \* \*